United States Patent
Pocovi et al.

(10) Patent No.: US 12,407,440 B2
(45) Date of Patent: Sep. 2, 2025

(54) METHOD, APPARATUS AND COMPUTER PROGRAM

(71) Applicant: Nokia Solutions and Networks Oy, Espoo (FI)

(72) Inventors: Guillermo Pocovi, Aalborg (DK); Klaus Ingemann Pedersen, Aalborg (DK); Roberto Maldonado, Aalborg (DK); Masoumeh Mokhtari, Aalborg (DK)

(73) Assignee: Nokia Solutions & Networks Oy, Espoo (FI)

( * ) Notice: Subject to any disclaimer, the term of this patent is extended or adjusted under 35 U.S.C. 154(b) by 0 days.

(21) Appl. No.: 18/989,125

(22) Filed: Dec. 20, 2024

(65) Prior Publication Data

US 2025/0211362 A1    Jun. 26, 2025

(30) Foreign Application Priority Data

Dec. 21, 2023   (FI) .................................. 20236419

(51) Int. Cl.
| | |
|---|---|
| *H04L 5/00* | (2006.01) |
| *H04B 17/309* | (2015.01) |
| *H04L 1/00* | (2006.01) |
| *H04L 5/14* | (2006.01) |

(52) U.S. Cl.
CPC ......... *H04L 1/0003* (2013.01); *H04B 17/346* (2023.05); *H04L 5/0053* (2013.01); *H04L 5/14* (2013.01)

(58) Field of Classification Search
CPC ........ H04L 5/0053; H04L 5/14; H04B 17/346
See application file for complete search history.

(56) References Cited

U.S. PATENT DOCUMENTS

| | | | |
|---|---|---|---|
| 2013/0194940 A1 | 8/2013 | Li et al. | |
| 2021/0136696 A1 | 5/2021 | Burke et al. | |
| 2021/0376960 A1* | 12/2021 | Huang ................. | H04L 5/0091 |
| 2021/0377986 A1* | 12/2021 | Awoniyi-Oteri ...... | H04L 1/1812 |

(Continued)

FOREIGN PATENT DOCUMENTS

WO   WO-2020145658    *   7/2020    ............... H04L 1/00

OTHER PUBLICATIONS

3GPP TSG-RAN WG1 Meeting#96, R1-1902408 Title: Enhancements on UL Multi-Beam Operation (Year: 2019).*

(Continued)

*Primary Examiner* — Faruk Hamza
*Assistant Examiner* — Abusayeed M Haque
(74) *Attorney, Agent, or Firm* — McCarter & English LLP

(57) ABSTRACT

There is provided a method, computer program, and apparatus for causing a network access node to perform: calculating a first offset value based on first acknowledgment and negative acknowledgement information for signals received during subband full duplex, SBFD, slots; calculating a second offset value based on second acknowledgement and negative acknowledgment information for signals received during uplink-only slots or during downlink-only slots; and using the first and second offset values to determine respective first and second modulation and coding schemes, MCS, to be used for transmissions made in a subband full duplex, SBFD, slots and either uplink-only slots or downlink-only slots.

14 Claims, 6 Drawing Sheets

(56) References Cited

U.S. PATENT DOCUMENTS

| | | | |
|---|---|---|---|
| 2021/0377995 A1 | 12/2021 | Fakoorian et al. | |
| 2022/0322245 A1* | 10/2022 | Park | H04W 52/365 |
| 2023/0081058 A1 | 3/2023 | Gradus et al. | |
| 2023/0135716 A1* | 5/2023 | Ibrahim | H04L 5/14 370/329 |
| 2023/0180231 A1* | 6/2023 | Tian | H04W 72/1273 370/329 |
| 2023/0239880 A1* | 7/2023 | Wang | H04W 72/23 370/329 |
| 2023/0327798 A1 | 10/2023 | Jeong et al. | |
| 2023/0379956 A1 | 11/2023 | Zhang et al. | |

OTHER PUBLICATIONS

3GPP TSG RAN WG1 Meeting#90bis R1-1717967 Title:Consideration of CBG based retransmission for NR (Year: 2017).*

Peralta, E. et al., "Outer Loop Link Adaptation Enhancements for Ultra Reliable Low Latency Communications in 5G," 2022 IEEE 95$^{th}$ Vehicular Technology Conference, Jun. 19, 2022.

Hyejin Kim et al., Dynamic TDD Systems for 5G and Beyond: A Survey of Cross-Link Interference Mitigation, Fourth Quarter 2020, 34 pgs.

Ramez Askar et al., Interference Handling Challenges toward Full Duplex Evolution in 5G and Beyond Cellular Networks, Feb. 2021, 9 pgs.

Dell Technologies: "On deployment 1-14 scenarios and evaluation methodology of NR full duplex", 3GPP Draft; R1-2205810, Aug. 10, 2022, p. 2-p. 4; figure 2.

Mediatek Inc: "Deployment scenarios and 1-14 evaluation methodology for NR duplex evolution", 3GPP Draft; R1-2209769, Sep. 30, 2022, p. 5-p. 8.

* cited by examiner

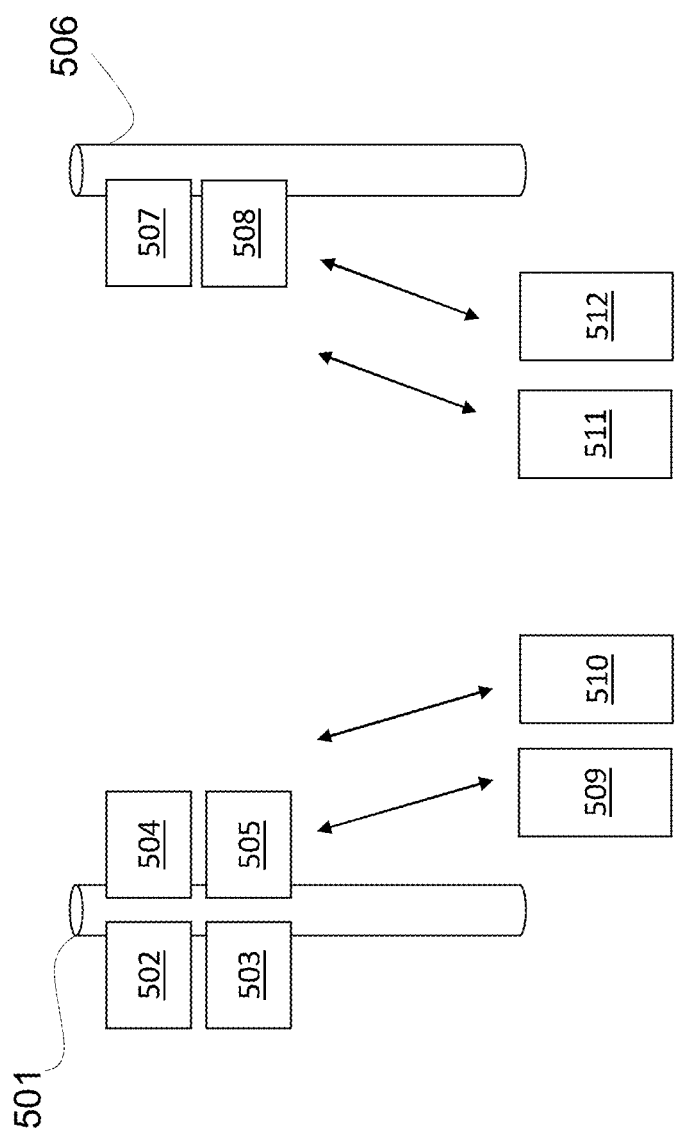

METHOD, APPARATUS AND COMPUTER PROGRAM

FIELD

The present application relates to an apparatus, method and computer program. In particular, but not exclusively, the present application relates to maintaining respective offsets for link adaptation for a sub-band full duplexing (SBFD) slots and non-SBFD slots.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

3GPP has described a flexible duplex slot (known as subband full duplex (SBFD) slot) which comprises resources for both uplink and downlink transmission opportunities within the same time slot. Stated differently, SBFD slots implement time duplex communication within a single carrier bandwidth in which transmissions in uplink and downlink simultaneously occur within different sub-bands of the carrier bandwidth

SUMMARY

According to a first aspect, there is provided an apparatus for a network access node, the apparatus comprising means for performing: calculating a first offset value based on first acknowledgment and negative acknowledgement information for signals received during subband full duplex, SBFD, slots; calculating a second offset value based on second acknowledgement and negative acknowledgment information for signals received during uplink-only slots or during downlink-only slots; and using the first and second offset values to determine respective first and second modulation and coding schemes, MCS, to be used for transmissions made in a subband full duplex, SBFD, slots and either uplink-only slots or downlink-only slots.

According to a second aspect, there is provided a method for an apparatus for a network access node, the method comprising: calculating a first offset value based on first acknowledgment and negative acknowledgement information for signals received during subband full duplex, SBFD, slots; calculating a second offset value based on second acknowledgement and negative acknowledgment information for signals received during uplink-only slots or during downlink-only slots; and using the first and second offset values to determine respective first and second modulation and coding schemes, MCS, to be used for transmissions made in a subband full duplex, SBFD, slots and either uplink-only slots or downlink-only slots.

According to a third aspect, there is provided an apparatus for a network access node, the apparatus comprising: at least one processor; and at least one memory comprising code that, when executed by the at least one processor, causes the apparatus to perform: calculating a first offset value based on first acknowledgment and negative acknowledgement information for signals received during subband full duplex, SBFD, slots; calculating a second offset value based on second acknowledgement and negative acknowledgment information for signals received during uplink-only slots or during downlink-only slots; and using the first and second offset values to determine respective first and second modulation and coding schemes, MCS, to be used for transmissions made in a subband full duplex, SBFD, slots and either uplink-only slots or downlink-only slots.

According to a fourth aspect, there is provided an apparatus for a network access node, the apparatus comprising: calculating circuitry for calculating a first offset value based on first acknowledgment and negative acknowledgement information for signals received during subband full duplex, SBFD, slots; calculating circuitry for calculating a second offset value based on second acknowledgement and negative acknowledgment information for signals received during uplink-only slots or during downlink-only slots; and using circuitry for using the first and second offset values to determine respective first and second modulation and coding schemes, MCS, to be used for transmissions made in a subband full duplex, SBFD, slots and either uplink-only slots or downlink-only slots.

The following may be performed in respect of any (e.g., all) of the above-mentioned first to fourth aspects.

The apparatus may be caused to perform: causing the first MCS to be used for transmissions made during at least one SBFD slot; and causing the second MCS to be used for transmissions made during an uplink-only slot or during a downlink-only slot.

The determining a first offset value may comprise: determining first acknowledgement and negative acknowledgment information for signals received during SBFD slots; and calculating the first offset value based on the first acknowledgment and negative acknowledgement information.

The using the first offset value to determine the first MCS to be used for transmissions made in SBFD slots may comprise: adjusting a first signal-to-interference and noise ratio, SINR, measured during the uplink-only slots or downlink-only slots using the first offset value to form a first adjusted SINR; and determining the first MCS using the first adjusted SINR.

The apparatus may be caused to perform: receiving the first SINR from a user equipment.

The apparatus may be caused to perform: receiving the first SINR in a channel quality indicator report and/or a channel state indicator.

The determining a second offset value may comprise: determining second acknowledgement and negative acknowledgment information for signals received during uplink-only slots or downlink-only slots; and calculating the second offset value based on the second acknowledgment and negative acknowledgement information.

The using the second offset value to determine the second MCS to be used for transmissions made in uplink-only slots or downlink-only slots may comprise: adjusting a second signal-to-interference and noise ratio, SINR, measured during the uplink-only slots or downlink-only slots using the second offset value to form a second adjusted SINR; and determining the second MCS using the second adjusted SINR.

The apparatus may be caused to perform: receiving the second SINR from a user equipment.

The apparatus may be caused to perform: receiving the second SINR in a channel quality indicator report and/or a channel state indicator.

The first and second offset values may be used during outer loop link adaptation mechanisms.

The transmission power used for downlink transmissions made during the SBFD slots may be different to the transmission power used for downlink transmissions made during the downlink-only slots.

According to an aspect, there is provided a non-transitory computer readable medium comprising program instructions that, when executed by an apparatus, cause the apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 5 illustrates types of interference that may arise in a radio network;

DETAILED DESCRIPTION

Figure 1:
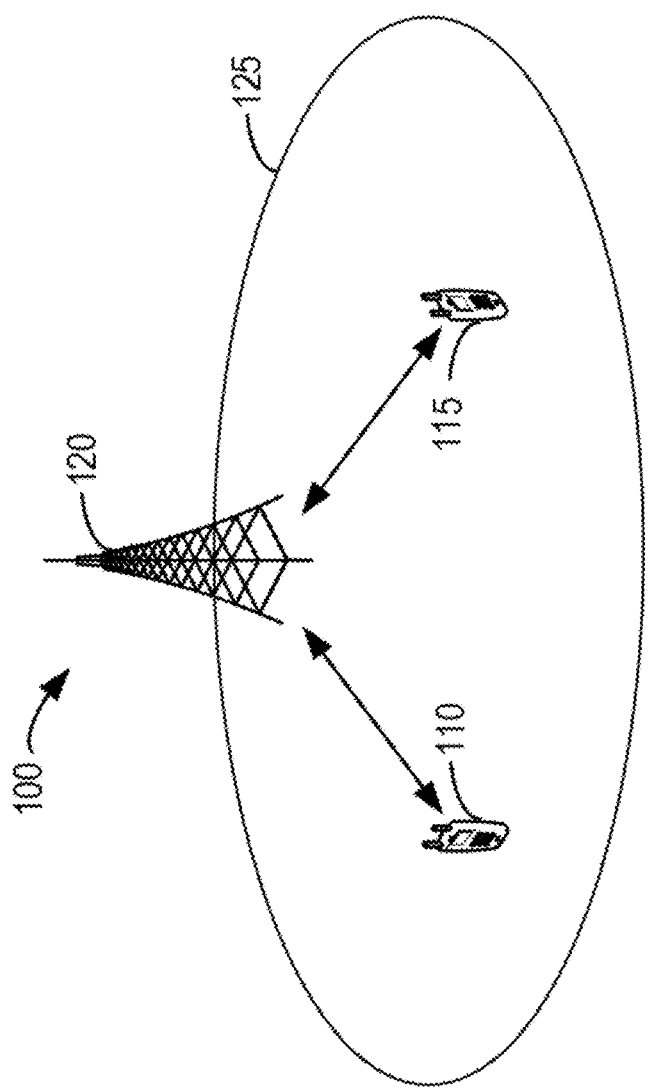
FIG. 1 shows a representation of a network system according to some example embodiments.

The following describes operations that may be performed in relation to signalling between a network access node and a user device during subband full duplex (SBFD) slots. SBFD slots comprise a mixture of uplink and downlink transmission opportunities (e.g. resources allocated for use in making uplink and downlink transmissions).

More specifically, the following considers situations in which different interference is expected to occur during SBFD slots relative to non-SBFD slots. For example, during SBFD slots, there are multiple types of crosslink interference that may arise as a result of the transmission resources being available for transmissions in different directions during the same time slot. This is described in further detail below in relation to FIG. 5.

For clarity and brevity, the following will discuss the presently described principles in the context of downlink transmissions. However, it is understood that analogous principles and operations may be performed in respect of the uplink transmissions.

Some mechanisms have been introduced for mitigating the effect of the different types of interference experienced during the different types of slots. For example, it has been proposed to allow, for downlink transmission opportunities, the access network node to transmit using a reduced transmission power during SBFD slots relative to downlink transmissions made by the access network node during non-SBFD slots.

Despite these mechanisms, the following recognizes that the differing interference experienced during SBFD slots relative to non-SBFD slots can still result in sub-optimal use of resources. To help make more efficient use of resources, the following proposes the use of different (e.g., independent) link adaptation parameter values for SBFD slot transmissions in a specific direction (e.g., downlink or uplink) relative to link adaptation parameters for non-SBFD slots in the specific direction. For example, considering downlink transmissions, this may result in there being, different modulation and coding schemes (MCS) for the downlink transmissions made during SBFD slots relative to the downlink transmissions made during the downlink only slots. This is because the MCS index used to identify which MCS to use for communications may be determined in dependence on such link adaption parameter values. These link adaptation parameters may be applied regardless of any differential power control mechanisms applied across the different slot types.

Stated differently, the following illustrates how respective link adaptation parameter values for controlling downlink transmission configuration parameters (such as MCS) in the different types of slots can be determined based on an adjusted signal-to-interference and noise ratio (SINR), or some other metric quantifying a downlink channel quality. The adjusted SINR may be calculated using a reported SINR value from a UE (corresponding to a measured downlink transmission quality) and a respective offset value for that type of slot.

This process is described further below.

FIG. 1 illustrates an example communication environment in which example embodiments of the present disclosure can be implemented.

FIG. 1 shows an example communication environment 100 in which example embodiments of the present disclosure can be implemented.

In the communication environment 100, a plurality of communication devices, comprising user devices 110 and 115 (also referred to herein as a "terminal" or "terminal device") and a network device 120 (also referred to herein as a "network access node"), can communicate with each other. The network device 120 may serve a coverage area, called a cell 125. The user device 110 may have access to a communication network via the cell 125. In some example embodiments, both the user device 110 and the network device 120 may be configured to implement a beamforming technique and communicate with each other via a plurality of beams.

The term "terminal device" refers to any end device that may be capable of wireless communication. By way of example rather than limitation, a terminal device may also be referred to as a communication device, user equipment (UE), a Subscriber Station (SS), a Portable Subscriber Station, a mobile device, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), a machine-type communications (MTC) device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user device", "user equipment" and "UE" may be used interchangeably.

As used herein, the term "network device" is used interchangeably with "network access node", and refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

In some example embodiments, a link from the network device 120 to the user device 110 or 115 is referred to as a DL, while a link from the user device 110 or 115 to the network device 120 is referred to as a UL. Links are also referred to herein as "channels". In DL, the network device 120 is a Tx device (or a transmitter), and the user device 110 or 115 is a Rx device (or a receiver). In UL, the user device 110 or 115 is a Tx device (or a transmitter), and the network device 120 is a Rx device (or a receiver). A link between the user device 110 and another user device (not shown) is referred to as a sidelink (SL). In SL, one of the user devices is a Tx device (or a transmitter), and the other of the user devices is a Rx device (or a receiver).

Different types of link adaptation mechanisms have been applied in 3GPP networks in order to efficiently use network resources. At least one purpose of Link Adaptation (LA) algorithms is to use feedback information regarding the state of a link (e.g., downlink and/or uplink) to perform the selection of an appropriate MCS for that link direction and UE.

For example, in long term evolution (LTE) networks, which utilized a constant downlink transmission power, the type of modulation and coding (MCS) scheme used for downlink transmission was selected based on a measured downlink channel quality. For example, links (e.g., channels) that are measured as having a worse channel quality (e.g., below a predetermined threshold) may be configured to have transmissions made on them using a more robust MCS scheme than those links that are measured as having a better channel quality.

The channel quality may be measured in any of a plurality of different ways. The mechanism used for measuring channel quality may be selected based on the direction of the link being assessed, the types of signals being transmitted, and the capabilities of the receivers that are measuring the channel quality.

One example metric that indicates the channel quality is the channel quality indicator (CQI). The CQI is a measure of a downlink signal quality that is determined by a UE. CQI is measured from the reference symbols transmitted by network access node. The CQI measurement interval, measurement resolution in frequency domain, reporting mechanisms, etc. are all configurable parameters. Once determined by the UE, the determined CQI may be sent by the UE to the network access node. The determined CQI may comprise a signal-to-interference and noise ratio (SINR) for the measured channel.

When the network access node has received the CQI, the network node may deploy link adaptation techniques known as Inner Loop Link Adaptation (ILLA) and Outer Loop Link Adaptation (OLLA).

The Inner Loop Link Adaptation (ILLA) is used to select an MCS to use for transmissions sent to a specific UE. This selection may be based on a measured Signal to Interference plus Noise Ratio (SINR) reported to the network access node in the CQI report. The block error rate (BLER) may also be used as an input to the ILLA algorithm. For example, for the same SINR (e.g. 10 dB), a UE with BLER 10% can be assigned a higher MCS than a UE with a lower BLER (e.g., lower than 10%). There may be ranges of BLER that are paired with respective MCS index values for determining which MCS to use. For example, for the same SINR, a UE with a BLER between 5%-10% can be assigned a higher MCS than a UE with a lower BLER (e.g., lower than 1%-5%). For example, the access network node may be configured with a mapping that pairs together ranges of SINRs to respective MCS types, such that a value of an SINR may be used to select its respective MCS type according to the configured mapping.

This initial MCS selection may be fine-tuned by using an OLLA function. The OLLA function uses feedback information (e.g., acknowledgements and/or negative acknowledgement information) received from a UE to adapt the SINR that is input to the ILLA for selecting MCS used for downlink transmission. The target of the OLLA function is to adapt the MCS selection to ensure that a certain Block Error Rate (BLER) target is met.

For example, an OLLA algorithm determines an OLLA offset value based on received acknowledgement data (e.g., ACK/NACK) from a UE. The determined OLLA offset value is subtracted from the received SINR measurements comprised in the CQI for forming adjusted SINR measurements. The adjusted SINR values are then used by the ILLA mechanism with the above-mentioned mapping to determine an MCS value to be used for downlink transmission. Stated differently, the adjusted SINR values are used by the ILLA mechanism instead of the received SINR values when determining an MCS to be used for transmitting on a specific link to a specific UE.

The OLLA offset value may be increased or decreased based on whether an acknowledgement or negative acknowledgement is received. For example, the OLLA offset value maybe increased when a NACK is received, and decreased using a smaller value step when receiving an ACK. The ratio between the step-up and step-down size controls the average experienced BLER. For example, when an Acknowledgement (Ack or ACK) is received for a first transmission, an OLLA offset value, A, may be decreased by Aup decibels, while it is increased by Adown decibels when a Negative Acknowledgement (Nack or NACK) is received.

Stated differently, the OLLA mechanism may be considered to provide an OLLA offset value that is used to offset the received CQI metric used for selecting the MCS to be used for transmissions. The value of the OLLA offset value may be based on received DL feedback, such as hybrid automatic repeat request (HARQ) feedback. This OLLA offset value (which is a UE-specific offset) is used to account for potential CQI estimation imperfections and/or CQI reporting delay.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
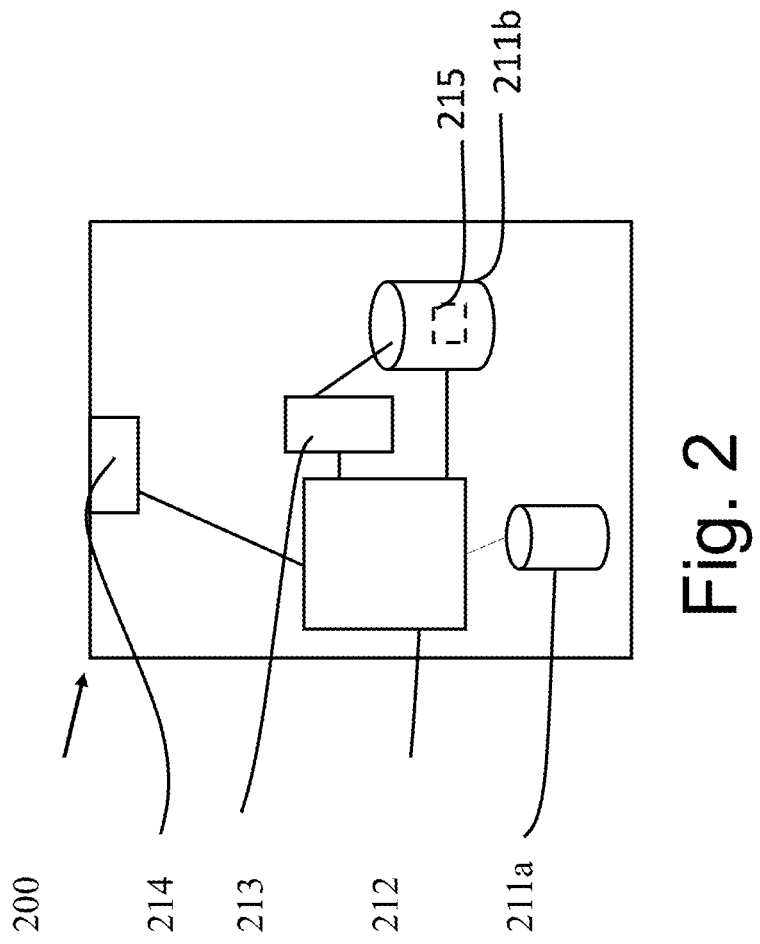
FIG. 2 shows a representation of a control apparatus according to some example embodiments.

FIG. 2 illustrates an example of a control apparatus 200 for causing a network device 120 (such as the network device described in FIG. 1) to perform its operations. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the network device. In some embodiments, each function of the network device comprises a control apparatus 200. In some exemplary embodiments, the apparatus 200 may be implemented at the network device 120 or may be the network device 120.

Figure 3:
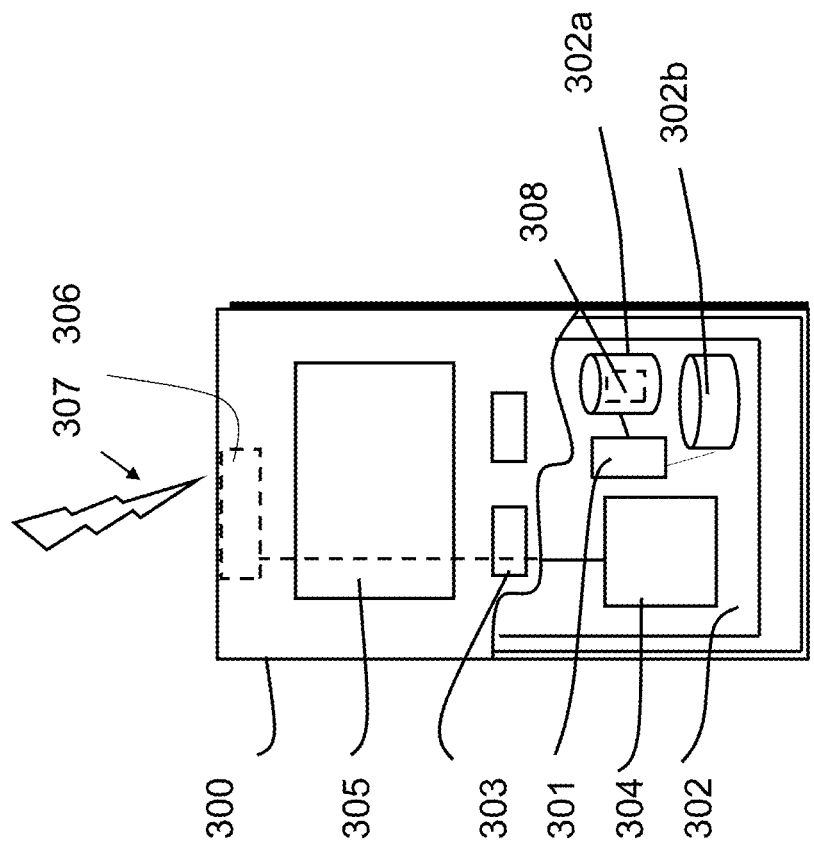
FIG. 3 shows a representation of an apparatus according to some example embodiments.

FIG. 3 illustrates an example of a terminal 300, such as the user device 110, 115 illustrated on FIG. 1. The terminal 300 may be provided by any device capable of sending and receiving radio signals, such as the user device described herein. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems (such as a network access system provided by the network device described above in relation to FIGS. 1 and 2) and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

In some exemplary embodiments, the terminal 300 may be an apparatus comprising at least one processor and at least one memory storing instructions that, when executed by the at least one processor, cause a user device 110, 115 to perform examples or embodiments described in this document.

3GPP 5G NR currently supports two duplexing modes: frequency division duplex (FDD) and time division duplex (TDD). In TDD, the time domain resource is split between downlink and uplink. To help improve capacity, coverage and/or latency in TDD usage, flexible duplexing was introduced.

As mentioned above, flexible duplexing relates to the use of different slot formats that comprise concurrent transmission opportunities for both uplink and downlink in the same channel. 3GPP considered flexible duplexing in 5G-Advanced Release-18, and in 3GPP TR 38.858. A transmission opportunity may be considered to be a time-frequency resource that is available for a radio transmission or reception. Therefore, an uplink transmission opportunity may be considered to be a time-frequency resource that is available for uplink transmission, and a downlink transmission opportunity may be considered to be a time-frequency resource that is available for downlink transmission. A channel may be considered to comprise a logical or physical connection over a transmission medium. Example channels defined in 3GPP comprise at least a physical downlink control channel (PDCCH), and a physical uplink shared channel (PUSCH), etc.

One of the new flexible duplexing slot formats introduced for both downlink (DL) and uplink (UL) transmission opportunities between a network access node and a user device is a sub-band non-overlapping full duplexing (SBFD) slot format. Time slots that comprise an SBFD slot format comprise a mixture of uplink and downlink resources (e.g., time-frequency resources that may be used for transmission and/or reception, depending on whether the resource is for uplink or downlink).

There are a range of different types of SBFD slots that reflect different makeups of uplink and downlink transmission opportunities. For example, an SBFD slot may comprise a mixture of uplink and downlink transmission opportunities. Further, where there is a mixture of uplink and downlink transmission opportunities, an SBFD slot may comprise uplink resources near a central frequency portion of the slot (e.g., sandwiched between downlink resources for downlink transmission resources), or at an extreme of the range of frequencies of the slot (e.g., at the lowest frequency of the slot, or at a highest frequency of the slot). In both cases, the uplink resources may be separated from the downlink resources by a guard band. A guard band may be considered as being a narrow range of frequencies that separates two ranges of wider frequency (e.g., carrier frequencies respectively associated with uplink and downlink resources) that is unused for transmission opportunities in either uplink or downlink directions.

Figure 4:
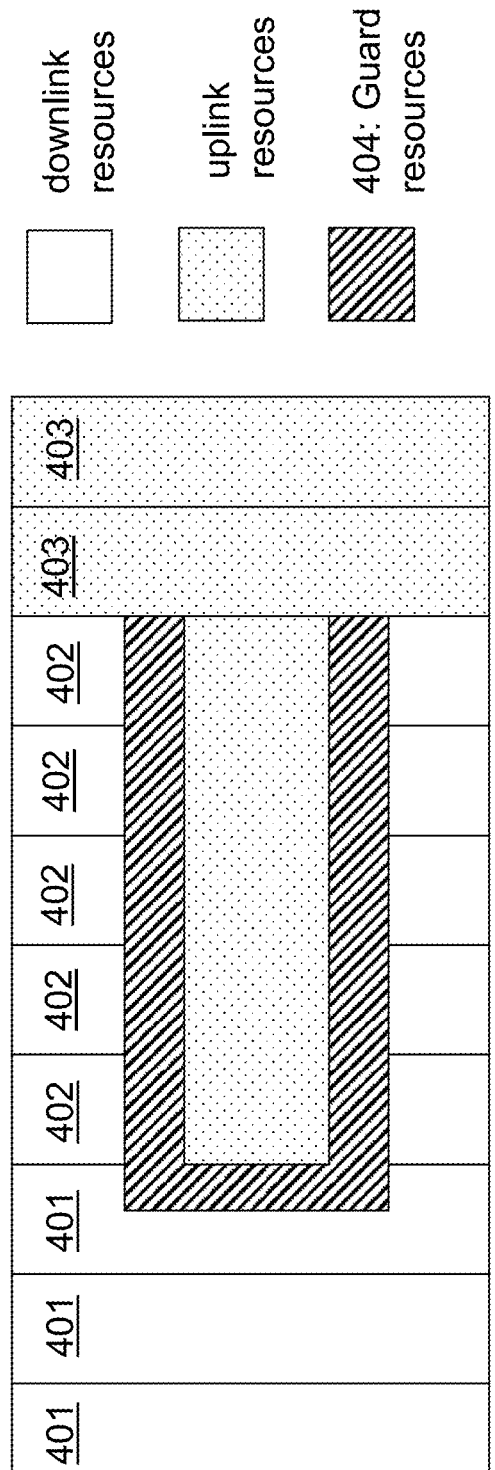
FIG. 4 shows a representation of downlink, uplink, and SBFD slots.

A Flexible Duplexing frame structure that includes SBFD slots is illustrated with respect to FIG. 4.

FIG. 4 illustrates an example of an enhanced radio frame configuration that comprises three DL slots 401 followed by five SBFD slots 402, and two UL slots 403. Each SBFD slot in FIG. 4 is illustrated as comprising resources (e.g., time-frequency resources) for DL transmission, guard band (e.g., unused resources that may denote a boundary between uplink and downlink transmissions, represented in FIG. 4 as gaps 404 between UL and DL resources), and UL resources in the middle.

Each slot in FIG. 4 illustrates a time duration considered to comprise concurrent transmissions. For example, each of the SBFD slots comprise both UL and DL transmission opportunities on respective frequency carriers that are performed simultaneously. The SBFD slot formats with concurrent DL and UL transmission opportunities are occasionally labelled "X-slots".

As SBFD slots comprise contemporaneous UL and DL transmission opportunities, several different types of interference may arise. These are illustrated with respect to FIG. 5.

FIG. 5 illustrates a first network access node 501 that comprises a first downlink antenna panel 502 for transmitting downlink transmissions in a first sector, a first uplink antenna panel 503 for receiving uplink transmissions in the first sector, a second downlink antenna panel 504 for transmitting downlink transmissions in a second sector, and a second uplink panel 505 for receiving uplink transmissions in the second sector.

FIG. 5 further illustrates a second network access node 506 that comprises a third downlink antenna panel 507 for transmitting downlink transmissions in a third sector, and a third uplink antenna panel 508 for receiving uplink transmissions in the third sector.

FIG. 5 further shows first to fourth user equipment 509 to 512. The first and second UE 509, 510 are said to "belong" to the second sector of the first network access node as they are configured to transmit and/or receive signalling with the second downlink antenna panel and/or the second uplink antenna panel. The third and fourth UE 511, 512 are said to "belong" to the third sector of the second network access node as they are configured to transmit and/or receive signalling with the third downlink antenna panel and/or the third uplink antenna panel.

Five types of interference may arise in the system depicted in FIG. 5. For example, this system may comprise at least one of:
1. Intra-node cross link interference between uplink and downlink antenna panels belonging to the same sector (e.g., between transmissions transmitted by the first downlink antenna panel 502 and transmissions received by the first uplink antenna panel 503, between transmissions transmitted by the second downlink antenna panel 504 and transmissions received by the second uplink antenna panel 505, and/or between transmissions transmitted by the third downlink antenna panel 507 and transmissions received by the third uplink antenna panel 508);
2. Intra-node cross link interference between uplink and downlink antenna panels belonging to different sectors (e.g., between transmissions transmitted by the first downlink antenna panel 502 and transmissions received by the second uplink antenna panel 505, and/or between transmissions transmitted by the second downlink antenna panel 504 and transmissions received by the first uplink antenna panel 503);
3. Inter-node cross link interference between uplink and downlink antenna panels belonging to different nodes (e.g., transmissions transmitted by the second downlink antenna panel 504 and transmissions received by the third uplink antenna panel 508, and/or between transmissions transmitted by the third downlink antenna panel 507 and transmissions received by the second uplink antenna panel 505);
4. Intra-cell interference between UE belonging to a same sector (e.g., between the first and second UE 509, 510, and/or between the third and fourth UE 511, 512); and
5. Inter-cell interference between UE belonging to different sectors (e.g., between the first UE 509 and the third and/or fourth UE 511, 512, between the second UE 510 and the third and/or fourth UE 511, 512, between the third UE 511 and the first and/or second UE 509, 510, and/or between the fourth UE 512 and the first and/or second UE 509, 510).

Stated differently, cross link interference may arise as a result of intra-network access node transmissions (e.g., as a result of DL transmissions made by a network access node on UL transmissions to be received by that network access node), and/or as a result of inter-network access node transmissions (e.g., as a result of DL transmissions made by a network access node on UL transmissions to be received by another network access node).

Cross link interference at the access node can be particularly problematic as there is a large power imbalance between downlink transmissions from a network access node and uplink transmissions from UE.

One mechanism that has already been introduced to mitigate against interference relates to guard bands (as illustrated in FIG. 4). Guard bands provide a form of isolation between uplink and downlink transmissions for reducing the impact of interference arising between uplink and downlink transmissions.

To reduce the likelihood of cross link interference on UL transmissions in an SBFD slot, the transmission power for DL transmissions may be reduced within such slots. This is illustrated with respect to FIG. 6, which illustrates DL transmission power control being performed on a per-slot basis.

Figure 6:
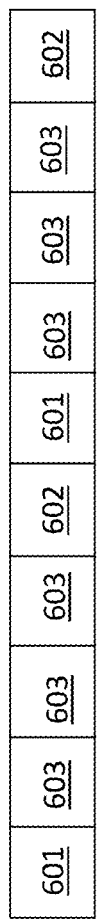
FIG. 6 shows a representation of a frame format.

FIG. 6 illustrates 10 time slots: The first and sixth time slots are downlink-only slots 601 (e.g., time slots for only downlink transmission opportunities), the fifth and tenth time slots are uplink slots 602 (e.g., time slots for uplink transmission opportunities), and the second to fourth and seventh to ninth time slots are for flexible time slots 603 (e.g., time slots for SBFD transmission opportunities). In the present example, downlink transmission opportunities in the SBFD slots 603 are transmitted using a "reduced" power (relative to a nominative transmission power) while downlink transmission opportunities in the first and fifth time slots are transmitted using the nominative transmission power. The SBFD slot power reduction applies to all downlink transmissions made during the SBFD slots (e.g., Channel State Indicator-reference signal (CSI-RS), physical downlink control channel (PDCCH), and Physical Downlink Shared Channel (PDSCH) transmissions) and is not restricted to a type of signal within a time slot.

Therefore, FIG. 6 illustrates different reference signal transmissions being transmitted on different downlink transmission opportunities using respective (different) transmission powers. This is because the downlink transmission power control is being applied on a per-slot basis. This is different to how downlink transmission power control has previously been performed for downlink transmission opportunities.

There may therefore exist situations in which downlink-only transmission slots are transmitted using a higher power than the power used for those downlink transmissions comprised in SBFD transmission slots.

The following recognizes that despite applying different downlink transmission powers for different types of time slots, there may still exist a non-optimized usage of the resources used for downlink transmissions.

In particular, the following identifies that it would be useful to configure an access network node to, for each UE, maintain independent OLLA offset values for different types of slots. Stated differently, it is disclosed to configure an access network node to, for each UE, perform independent OLLA mechanisms for different slot types (e.g., to perform independent determinations of the OLLA offset values for SBFD and non-SBFD slot types) for selecting MCS for transmission to that UE. This means that downlink-only slots will have a different OLLA offset value maintained for them compared to the OLLA offset value maintained for downlink transmissions in SBFD slots.

This is in contrast to current systems, in which there is currently only a single OLLA offset value maintained at the network access node for each UE. Stated differently, currently, regardless of the type of slot in which a downlink transmission is made, the same OLLA offset value is used for adjusting the SINR for selecting the MCS to be used for downlink transmissions.

As mentioned above, OLLA is used at a network access node to apply a correction offset (e.g., the "OLLA offset value" mentioned herein) to a reported CQI metric of a signal received by a UE, wherein the OLLA offset value is determined based on feedback received from the UE for that signal.

For example, the network access node may configure a UE with a configuration for providing channel quality indicator (CQI) reports. This configuration may define whether the CQI reports are to be provided periodically and/or aperiodically.

The UE may subsequently perform measurements on at least one reference signal according to the provided configuration. The measurements may be performed on at least one reference signal transmitted in a downlink-only slot.

Based on this reported information, the network access node runs independent OLLA algorithms for each slot type. Stated differently, the network access node determines and applies a first OLLA offset factor for downlink-only slots, and determines and applies a second OLLA correction factor (which is different to the first OLLA correction factor) for SBFD slots. The first and second OLLA correction factors being updated based on UE ACK/NACK feedback of physical downlink shared channel (PDSCH) reception in their respective slot types.

For example, when a network access node determines that a power reduction mechanism is to be applied for downlink transmissions performed during SBFD slots (e.g., and that no power reduction mechanism is to be applied for downlink transmissions performed during downlink-only slots), the network access node may initiate a "training" stage in which respective OLLA offset values are determined for each type of slot and/or a mapping is determined between pairs of ranges of SINR values and respective MCS values.

During the training stage, for each UE, the network access node may cause downlink transmissions to be performed using a first modulation and coding scheme. The receiving UE determines a quality of the downlink reference signal that is indicative of the channel quality of the channel over which the downlink reference signal is transmitted (e.g., an SINR). The determined quality is provided from the UE to the network access node (e.g., in a CQI report). This CQI report may relate to downlink transmissions made on only the downlink only transmission slots. The UE further provides the network access node with feedback information comprising acknowledgement information (e.g., ACKs and/or NACKs) for each of the downlink only slots and the SBFD slots. The feedback information may be in accordance with a HARQ scheme.

The network access node uses the respective feedback information to calculate an OLLA offset value that is specific for that slot type (e.g., acknowledgement information for SBFD slots is used for calculating an OLLA offset value for the SBFD slots, while acknowledgement information for downlink-only slots is used for calculating a different OLLA offset value for downlink-only slots).

For each calculated OLLA offset value (e.g., for each slot type), the calculated OLLA offset is used to adjust a value of the determined quality comprised in the CQI report to form an adjusted value of the determined quality. The adjusted value of the determined quality is used by the access network node (e.g., as part of an ILLA mechanism) to select an MCS to be used for that slot type for that UE. This may be performed using the mapping procedure described above. The mapping procedure may use a default mapping and/or a previously determined mapping between pairs of MCS type (and/or value(s)) and ranges of SINR.

Once an MCS value has been selected for downlink transmissions for a specific UE, this value may be used unless and until the feedback information and/or the SINR values indicate that the MCS value should be changed, and/or until the power reduction factor is no longer applied during the SBFD slots.

Figure 7:
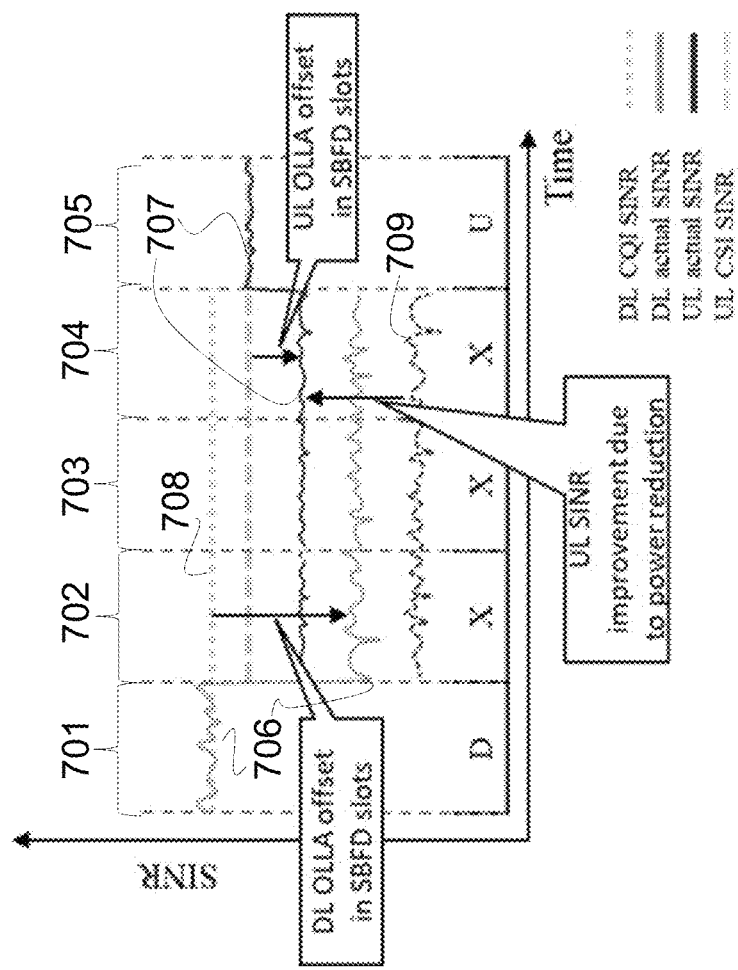
FIG. 7 illustrates signal-to-interference and noise ratio to noise.

FIG. 7 illustrates a combination of the DL transmit power reduction and the role of the OLLA offset. Stated differently, FIG. 7 illustrates how a signal-to-interference and noise ratio (SINR) may be calculated in a variety of slot types. SINR is mapped along the y axis, while time is shown along an x axis. FIG. 7 illustrates how the calculated SINR varies in a downlink only slot 701, a first SBFD slot 702, a second SBFD slot 703, a third SBFD slot 704, and an uplink only slot 705. The solid line 706 represents the actual downlink SINR, the solid line 707 represents the uplink actual SINR, the dashed line 708 represents the downlink CQI SINR, and the dashed line 709 represents the uplink CSI SINR without power reduction.

For example, in DL, the SINR drops from the DL slot to the X slots due to the power reduction. Moreover, the CQI reported in the DL slot is quite far from the actual DL channel conditions during SBFD slots. To compensate for such difference between "current channel state" and "expected channel state according to the last CQI", the OLLA offset is used.

As illustrated in FIG. 7, the UE's DL SINR conditions in DL-only slots (SINR_DL_only) can be obtained by calculating the difference between the first OLLA offset value (OLLA_offset_1) determined from feedback information relating to signals received by the UE during the downlink only slots from the SINR comprised in the CQI report (CQI_report). Stated differently, SINR_DL_only=CQI_report−OLLA_offset_1, (e.g., the value of the SINR minus the value of the first OLLA offset value).

Analogously, the UE's DL SINR conditions in SBFD slots (SINR_SBFD_DL) can be obtained by calculating the difference between the second OLLA offset value (OLLA_offset_2) determined from feedback information relating to signals received by the UE during the SBFD slots from the SINR comprised in the CQI report (CQI_report) mentioned in the preceding paragraph. Stated differently, SINR_SBFD_DL=CQI_report−OLLA_offset_2 (e.g., the value of the SINR minus the value of the second OLLA offset value).

The difference between the DL SINR values calculated for the two different types of slots ($\Delta$SINR) equals the difference between the second OLLA offset value and the first OLLA offset value (e.g., OLLA_offset_2−OLLA_offset_1). $\Delta$SINR is not always equivalent to the DL power reduction factor applied by the network access node. Instead, $\Delta$SINR may be different for each UE. This may be the result of, for example, a distance of the UE from the location of the transmitter of the access network node (which is considered herein to be located at the center of the cell), and/or a result of inter-cell and/or intra-cell interference.

For example, for a UE very close to the center of a cell, the DL received signal power may be very high, regardless of whether a power reduction is applied during a flexible slot. This means that $\Delta$SINR may be very small.

For a UE in the middle of the cell (e.g., approximately halfway between the center of the cell and the edge of the cell), $\Delta$SINR may be small when there is some coordination between the cells on the power reduction offset that is applied. For example, for an interference limited UE, the interference is considered to be much larger than the noise. This leads the SINR to be largely calculated by the ratio of desired signal to intra-and/or inter-access network node interference (e.g., SINR is approximately S/I). Consequently, the $\Delta$SINR will not change when both the desired signal, S, and the interference signal, I, are reduced by the same factor.

Further, for a UE located close to the edge of a cell, the noise is likely to be much larger than the interference arising from inter-or intra-access network node transmissions (e.g., noise>>interference). In this case, SINR may be approximated to the radio of signal to noise (e.g., SINR is approximately S/N). Consequently, the $\Delta$SINR will be directly and largely affected by any reductions in the transmission power used to transmit the desired signal, S.

As mentioned above, $\Delta$SINR may be also affected depending on the amount of UE-to-UE CLI experienced by a UE in SBFD slots regardless of the UE position in the cell.

Thus, in summary, for a cell-edge UE, during SBFD slots experiencing transmission power reduction or for a UE experiencing large amount of UE-to-UE CLI in SBFD slots, during the OLLA training stage the PDSCH transmissions over SBFD slots with reduced network access node power are likely to be incorrectly decoded due to poor SINR conditions. This will result in a larger amount of negative acknowledgement feedback being transmitted back to the network access node relative to situations in which no transmission power reduction is being applied or when there are lower amounts of UE-to-UE CLI in SBFD slots. Consequently, the network access node receiving the relatively large amount of negative acknowledgement feedback increases the OLLA offset value that was previously used for calculating an adjusted SINR value for SBFD slots. The MCS to be used for downlink transmissions made during the SBFD slots is subsequently derived from the reported CQI index after subtracting the updated/new OLLA offset value. Further, any scheduling metric of the cell-edge UEs may reduce as a result of an increase of the OLLA offset so that the scheduling metric is lower and therefore it is less likely to cause cell-edge UEs to be scheduled resources during SBFD slots.

For a UE near the center of the cell during SBFD slots with applied transmission power reduction, the SINR conditions are determined to be relatively good (e.g., the SINR is above a predetermined threshold). Due to the good SINR conditions, the impact of the reduced network access node power transmissions is smaller than it is for cells closer to the cell's edge, and the PDSCH decoding rate during SBFD slots remains relatively stable compared to full power DL-only slots. Subsequently, the OLLA offset is updated and applied to the CQI at the network access node. As similar SINR conditions exist for both slot types, the two independent OLLA offsets (e.g., the OLLA offsets for the downlink only slot and the SBFD slot) are similar. Further, any the scheduling metric of the cell-centered UEs is relatively high, such that UEs closer to the cell center are more likely to be scheduled resources for receiving downlink transmissions during SBFD slots relative to UEs that are closer to the cell edge.

Although the above describes examples in the context of downlink transmissions, it is understood that the same features may be applied in respect of the UL direction. For uplink cases, the channel quality metric may correspond to the UL channel state information (CSI) or SINR measured by the network access node instead of the UE-reported CQI. For example, the network access node may measure channel and interference in an uplink slot, and slot-specific OLLA offset values may be used to differentiate the actual uplink signal quality in SBFD slots relative to uplink-only slots.

Features of the above examples are illustrated below with reference to FIG. 8. It is therefore understood that the below-mentioned features may find functional correspondence with at least on feature mentioned above. It is further understood that the above merely provides an example of how the following described features may be implemented in a communication network.

Figure 8:
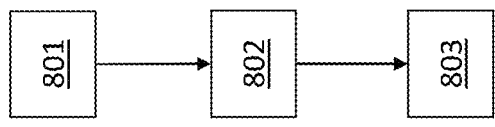
FIG. 8 illustrates operations that may be performed by apparatus described herein.

FIG. 8 illustrates operations that may be performed by an apparatus for a network access node. The network access node may comprise, for example, a gNB. The apparatus of the network access node may be as described above in relation to FIG. 2. Stated differently, the example apparatus of FIG. 3 may be configured to perform the following features.

During 801, the apparatus calculates (e.g., computes) a first offset value based on first acknowledgment (ACK) and negative acknowledgement (NACK) information for signals received during subband full duplex, SBFD, slots. Stated differently, the apparatus calculates a first offset using ACK and NACK information that relates to only information transmitted and/or received during SBFD slots (e.g., without using ACK and NACK information that relates to non-SBFD slots). The first acknowledgement and negative acknowledgment information may be received from a terminal (e.g., a UE). The information transmitted and/or received during SBFD slots may be transmitted and/or received from the terminal. The functionality of the terminal may be as described above in relation to FIG. 3.

The first offset value may be labelled as a first OLLA offset value.

During 802, the apparatus calculates (e.g., computes) a second offset value based on second acknowledgment and negative acknowledgment information for signals received during uplink-only slots or during downlink-only slots. The second acknowledgement and negative acknowledgment information may be received from the terminal. Stated differently, the apparatus calculates a second offset using ACK and NACK information that relates to only information transmitted and/or received during non-SBFD slots (e.g., without using ACK and NACK information that relates to SBFD slots). The information transmitted and/or received during non-SBFD slots may be transmitted and/or received from the terminal.

The second offset value may be labelled as a second OLLA offset value. For both the first and second acknowledgement information, the respective ACK and NACK information may have been provided as part of a physical protocol layer ACK/NACK operation, such as a HARQ operation. In some examples, the ACK and NACK information may have been provided as part of a network and/or transport protocol layer operation.

801 and 802 may be performed based on the direction of transmission being considered.

For example, when 801 is performed based on (e.g., using) only first acknowledgement information relating to the downlink transmissions of the SBFD slot(s), 802 is consequently performed based on (e.g., using) second acknowledgement information relating to only transmissions made during downlink-only time slots (e.g., the second acknowledgement information does not comprise ACK/NACK information for uplink-only slots).

Analogously, when 801 is performed based on (e.g., using) only first acknowledgement information relating to the uplink transmissions of the SBFD slot(s), 802 is consequently performed based on (e.g., using) second acknowledgement information relating to only transmissions made during uplink-only time slots (e.g., the second acknowledgement information does not comprise ACK/NACK information for transmissions made during downlink-only slots).

Stated differently, the first and second acknowledgement information is based on information transmitted in a same direction and in respective slot types (SBFD and non-SBFD).

During 803, the apparatus uses the first and second offset values to determine respective first and second modulation and coding schemes, MCS, to be used for transmissions made in a subband full duplex, SBFD, slots and either uplink-only slots or downlink-only slots.

The determining the respective first and second modulation schemes may comprise identifying respective index values that can be used to lookup the first and second modulation schemes (e.g., in a table or some other type of data structure).

The apparatus may cause the first MCS to be used for transmissions made during at least one SBFD slot (e.g., for a transmission to be made during a future SBFD slot).

The apparatus may cause the second MCS to be used for transmissions made during an uplink-only slot or during a downlink-only slot (e.g., for transmissions to be made during a future non-SBFD slot).

Depending on the direction of transmission being configured, these causings may involve configuring another device to transmit and/or receive using the determined respective first and second MCS.

The determining a first offset value may comprise: determining first acknowledgement and negative acknowledgment information for signals received during SBFD slots, and calculating the first offset value based on the first acknowledgment and negative acknowledgement information.

The using the first offset value to determine the first MCS to be used for transmissions made in SBFD slots may further comprise: adjusting a first signal-to-interference and noise ratio, SINR, measured during the uplink-only slots or downlink-only slots (e.g., during the non-SBFD slots) using the first offset value to form a first adjusted SINR, and determining the first MCS using the first adjusted SINR. The apparatus may receive the first SINR from a user equipment (e.g., as part of a CQI report and/or via channel state indicator signalling).

The determining a second offset value may comprise: determining second acknowledgement and negative acknowledgment information for signals received during uplink-only slots or downlink-only slots (e.g., received during non-SBFD slots), and calculating the second offset value based on the second acknowledgment and negative acknowledgement information.

The using the second offset value to determine the second MCS to be used for transmissions made in uplink-only slots or downlink-only slots may further comprise: adjusting a second signal-to-interference and noise ratio, SINR, measured during the uplink-only slots or downlink-only slots using the second offset value to form a second adjusted SINR, and determining the second MCS using the second adjusted SINR. The apparatus may receive the second SINR from a user equipment (e.g., as part of a CQI report and/or via channel state indicator signalling).

Stated differently, the first and second adjusted SINR may be calculated using the same SINR information (e.g., SINR information indicating a channel quality of an uplink-only and/or downlink-only transmission, depending on the direction being considered), and ACK and NACK information pertaining to different slot types (e.g., SBFD ACK and NACK information for the first adjusted SINR, and non-SBFD ACK and NACK information for the second adjusted SINR).

The transmission power used for downlink transmissions made during the SBFD slots may be different to the transmission power used for downlink transmissions made during the downlink-only slots.

Consequently, when the apparatus determines that a power reduction has been applied during a SBFD slot (e.g., for downlink SBFD transmissions), the apparatus may be configured to further calculate the first adjusted SINR based on (e.g., using) the applied value for this power reduction. The power reduction value is known by the apparatus as it is applied by the apparatus during SBFD slots.

The first and second offset values may be used during (e.g., used as part of) outer loop link adaptation mechanisms.

In an alternative example to the above, instead of the UE measuring a SINR during the downlink-only slots, the UE could instead measure a channel quality indicator for downlink transmissions made during SBFD slots. As mentioned above, the access network node may transmit downlink during SBFD slots using a reduced power (e.g., a power that is reduced relative to a nominative transmission power used for downlink transmissions made during the downlink-only slots). The access network node may subsequently maintain and use independent (e.g., separate) OLLA offset values for the SBFD slots and downlink-only slots, using this SBFD-measured CQI to track SINR changes in the downlink-only slots.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
 (c) a combination of analog and/or digital hardware circuit(s) with software/firmware and
 (d) any portions of hardware processor(s) with software (including digital signal processor(s)), software, and memory(ies) that work together to cause an apparatus, such as a mobile phone or server, to perform various functions) and
 (e) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions.

The software may be stored on such physical media as memory chips, or memory blocks implemented within the processor, magnetic media such as hard disk or floppy disks, and optical media such as for example DVD and the data variants thereof, CD. The physical media is a non-transitory media.

The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus for a network access node, the apparatus comprising:
   at least one processor; and
   at least one memory storing instructions that, when executed with the at least one processor, cause the apparatus to perform:
   calculating, for a terminal, a first offset value based on first acknowledgment and negative acknowledgement information for signals received during subband full duplex slots;
   calculating, for the terminal, a second offset value based on second acknowledgement and negative acknowledgment information for signals received during uplink-only slots or during downlink-only slots;
   using the first and second offset values to determine respective first and second modulation and coding schemes to be used with the terminal for transmissions made in a subband full duplex slots and either uplink-only slots or downlink-only slots;
   wherein the first offset value and the second offset value are terminal-specific correction offset values;
   adjusting a first signal-to-interference and noise ratio measured during the uplink-only slots or downlink-only slots using the first offset value to form a first adjusted signal-to-interference and noise ratio; and
   determining a first modulation and coding scheme using the first adjusted signal-to-interference and noise ratio.

2. An apparatus as claimed in claim 1, wherein the instructions, when executed with the at least one processor, cause the apparatus to perform:
   causing the first modulation and coding scheme to be used for transmissions made during at least one subband full duplex slot; and
   causing the second modulation and coding scheme to be used for transmissions made during an uplink-only slot or during a downlink-only slot.

3. An apparatus as claimed in claim 1, wherein the instructions, when executed with the at least one processor, cause the apparatus to perform:
   determining first acknowledgement and negative acknowledgment information for signals received during subband full duplex slots; and
   calculating the first offset value based on the first acknowledgment and negative acknowledgement information.

4. An apparatus as claimed in claim 1, wherein the instructions, when executed with the at least one processor, cause the apparatus to perform receiving the first signal-to-interference and noise ratio from the terminal.

5. An apparatus as claimed in claim 1, wherein the instructions, when executed with the at least one processor, cause the apparatus to perform receiving the first signal-to-interference and noise ratio in at least one of a channel quality indicator report or a channel state indicator.

6. An apparatus as claimed in claim 1, wherein the instructions, when executed with the at least one processor, cause the apparatus to perform:
   determining second acknowledgement and negative acknowledgment information for signals received during uplink-only slots or downlink-only slots; and
   calculating the second offset value based on the second acknowledgment and negative acknowledgement information.

7. An apparatus as claimed in claim 6, wherein the instructions, when executed with the at least one processor, cause the apparatus to perform:
   adjusting a second signal-to-interference and noise ratio measured during the uplink-only slots or downlink-only slots using the second offset value to form a second adjusted signal-to-interference and noise ratio; and
   determining the second modulation and coding scheme using the second adjusted signal-to-interference and noise ratio.

8. An apparatus as claimed in claim 7, wherein the instructions, when executed with the at least one processor, cause the apparatus to perform receiving the second signal-to-interference and noise ratio from the terminal.

9. An apparatus as claimed in claim 7, wherein the instructions, when executed with the at least one processor, cause the apparatus to perform receiving the second signal-to-interference and noise ratio in at least one of a channel quality indicator report or a channel state indicator.

10. An apparatus as claimed in claim 1, wherein the first and second offset values are used during outer loop link adaptation mechanisms.

11. An apparatus as claimed during claim 1, wherein the transmission power used for downlink transmissions made during the subband full duplex slots is different to the transmission power used for downlink transmissions made during the downlink-only slots.

12. A method for an apparatus for a network access node, the method comprising:
   calculating for a terminal a first offset value based on first acknowledgment and negative acknowledgement information for signals received during subband full duplex slots;
   calculating for the terminal a second offset value based on second acknowledgement and negative acknowledgment information for signals received during uplink-only slots or during downlink-only slots;
   using the first and second offset values to determine respective first and second modulation and coding schemes to be used with the terminal for transmissions made in a subband full duplex slots and either uplink-only slots or downlink-only slots;
   wherein the first offset value and the second offset value are terminal-specific correction offset values;
   adjusting a first signal-to-interference and noise ratio measured during the uplink-only slots or downlink-only slots using the first offset value to form a first adjusted signal-to-interference and noise ratio; and determining a first modulation and coding scheme using the first adjusted signal-to- interference and noise ratio.

13. A non-transitory program storage device readable with an apparatus, tangibly embodying a program of instructions executable with the apparatus for performing operations, the operations comprising:
calculating for a terminal a first offset value based on first acknowledgment and negative acknowledgement information for signals received during subband full duplex slots;
calculating for the terminal a second offset value based on second acknowledgement and negative acknowledgment information for signals received during uplink-only slots or during downlink-only slots; and
using the first and second offset values to determine respective first and second modulation and coding schemes to be used with the terminal for transmissions made in a subband full duplex slots and either uplink-only slots or downlink-only slots;
wherein the first offset value and the second offset value are terminal-specific correction offset values;
adjusting a first signal-to-interference and noise ratio measured during the uplink-only slots or downlink-only slots using the first offset value to form a first adjusted signal-to-interference and noise ratio; and
determining a first modulation and coding scheme using the first adjusted signal-to-interference and noise ratio.

14. An apparatus as claimed in claim 1, wherein the terminal-specific correction offset values are outer loop link adaptation offset values.

* * * * *